(12) United States Patent
Klump et al.

(10) Patent No.: US 8,241,180 B2
(45) Date of Patent: Aug. 14, 2012

(54) METHOD FOR CONTROLLING A CREEPING PROCESS AND DRIVE TRAIN CONFIGURED FOR SUCH METHOD

(75) Inventors: Markus Klump, Buehlertal (DE); Martin Vornehm, Buehl (DE); Dietmar Lang, Hoeheischweiler (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 573 days.

(21) Appl. No.: 12/478,498

(22) Filed: Jun. 4, 2009

(65) Prior Publication Data
US 2009/0305847 A1 Dec. 10, 2009

(30) Foreign Application Priority Data
Jun. 5, 2008 (DE) .................. 10 2008 027 072

(51) Int. Cl.
*B60W 10/02* (2006.01)

(52) U.S. Cl. .................. 477/86; 477/176; 477/180
(58) Field of Classification Search .............. 477/86
See application file for complete search history.

(56) References Cited

U.S. PATENT DOCUMENTS

| | | | |
|---|---|---|---|
| 4,505,368 A * | 3/1985 | Ackermann et al. | 477/84 |
| 2005/0020405 A1 * | 1/2005 | Dietzel | 477/110 |

* cited by examiner

*Primary Examiner* — Edwin A Young
(74) *Attorney, Agent, or Firm* — Simpson & Simpson, PLLC

(57) ABSTRACT

A drive train of a motor vehicle with an internal combustion engine, a torque converter and a transmission, wherein a separation clutch is provided between the internal combustion engine and the torque converter. In order to be able to perform a creeping process at a certain creeping velocity, the separation clutch is operated slipping. This way, the gearing of the startup process can be configured long, even when using a so-called hard torque converter, without having to tolerate a creeping velocity, which is too high.

11 Claims, 2 Drawing Sheets

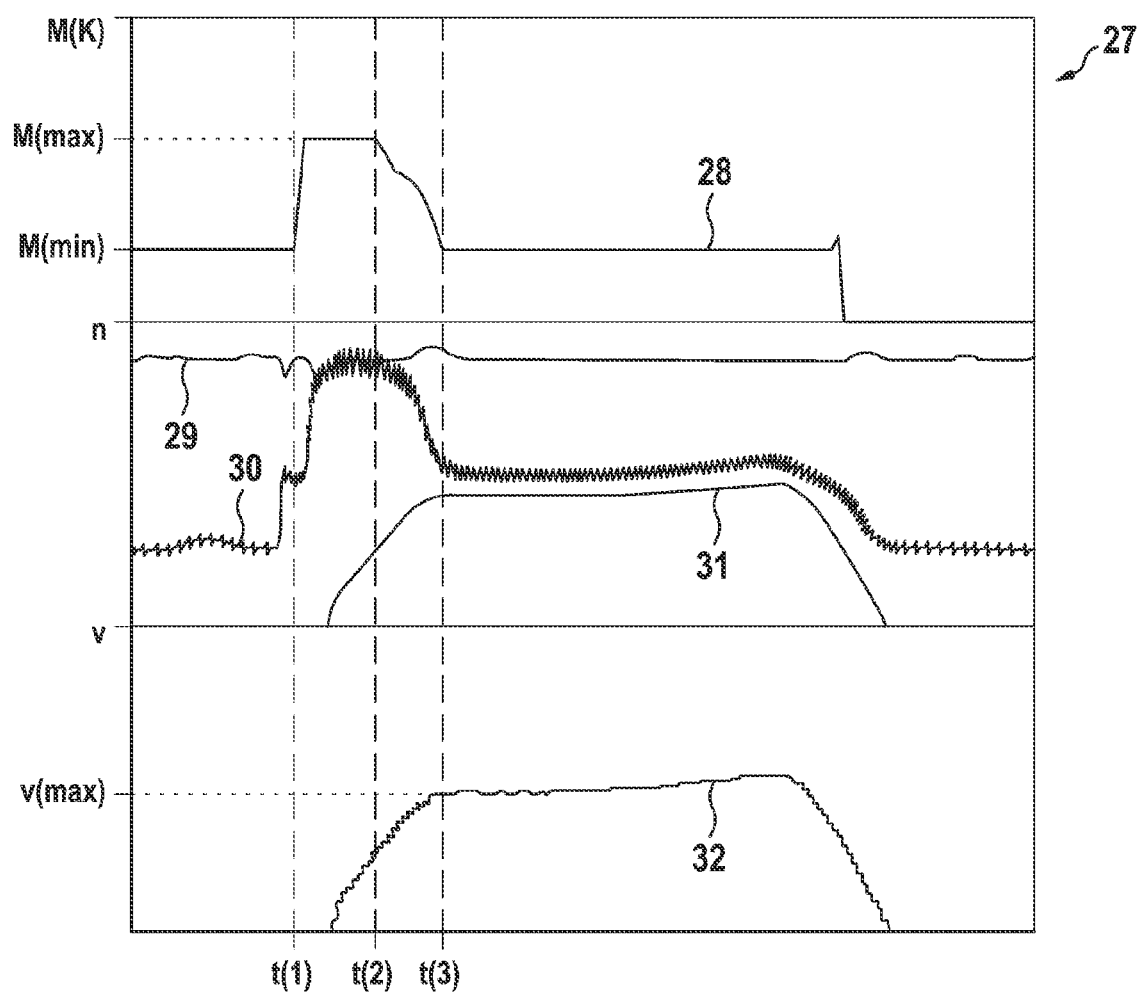

METHOD FOR CONTROLLING A CREEPING PROCESS AND DRIVE TRAIN CONFIGURED FOR SUCH METHOD

CROSS-REFERENCE TO RELATED APPLICATIONS

This patent claims priority of German Patent Application No. 10 2008 027 072.5, filed on Jun. 5, 2008, which application is incorporated herein by reference.

FIELD OF THE INVENTION

The invention relates to a drive train with an internal combustion engine, a torque converter and an automated transmission, and it relates to a separation clutch, disposed between the internal combustion engine and torque converter, and it relates to a method for controlling a creeping process for such drive trains.

BACKGROUND OF THE INVENTION

Automated transmissions are known, in which an internal combustion engine directly drives a torque converter as a start up element, which converts the input torque and transfers it to the automated transmission. Torque converters are thus configured in hydrodynamic construction with a pump shell directly driven by the internal combustion engine and with a turbine shell driven by the pump shell through an operating means, which turbine shell is coupled to the transmission on the output side. In order to augment the torque, a stator or a stator shell is fixed to the housing by means of a one-way clutch, which stator is supported at the housing at low speeds of the pump shell and transmits an additional torque into the operating means, and thus eventually to the turbine shell.

Due to the non-form locked connection of the turbine shell to the pump shell, the motor vehicle can be held standing still with a gear shifted and with the internal combustion engine running at idle. The idle torque occurring due to the standstill conversion can be held by the operating brake or by the parking brake. When the brake is released, the motor vehicle creeps independently. Thus the gearing of the start-up process is adapted to the characteristics of the torque converter in order to achieve a predetermined creeping velocity.

The characteristic, depends, for example, on the external shape, the type of blading of pump and turbine shells, the operating means used and similar factors. A difference is being made between so-called hard torque converters and soft torque converters, wherein a soft torque converter comprises a flat torque characteristic over the speed of the pump shell and a hard torque converter comprises a steeper torque characteristic over the speed of the pump shell. This yields a comparatively small efficiency for soft torque converters compared to hard torque converters.

In order to save fuel, transmissions are to be configured with a highest gear, which is configured as so-called overdrive, thus with a long gearing. This means that due to the limited gear ratio spread, in particular in planetary transmissions, the first gear, thus the start-up gear is also configured with a comparatively long gearing. In case of a soft torque converter, this leads to undesirably slow acceleration values of the motor vehicle, and in case of hard torque converters, this leads to unacceptably high creeping velocities in the range of the idle speed of the internal combustion engine. Furthermore, it is desirable in order to save fuel to avoid the energy consumption created by the converter slippage, when the internal combustion engine idles and the motor vehicle is stopped.

BRIEF SUMMARY OF THE INVENTION

Thus, it is an object of the invention to propose a drive train and a method for controlling a creeping process through the drive train, which provide reduced fuel burn and operation with an acceptable pre-determinable creeping velocity. Herein, in particular, energy savings through using a long start-up gear with a hard torque converter shall be implemented.

The object is accomplished through a method for controlling a creeping process in a drive train, comprising an internal combustion engine, a torque converter and an automated transmission, wherein the internal combustion engine and the torque converter can be decoupled from one another through a separation clutch, and the separation clutch is operated at least partially slipping during the creeping process. Through the method, the speed of the pump shell and thus of the turbine shell is decoupled from the combustion engine, so that a creeping velocity caused by a respective long gearing of the startup gear in combination with a hard torque converter can be converted to a lower pump shell speed to be transmitted to the pump shell through the slippage generated by means of the separation clutch between the crankshaft of the internal combustion engine and the pump shell of the torque converter. Thus, a speed of the combustion engine is simulated at the pump shell or generated, which speed is physically not adjustable at all at the combustion engine. This way, the torque converter can be configured hard in spite of a long gearing of the startup gear, without exceeding a desired creeping velocity of, e.g., 5 to 10 km per hour, which corresponds to a speed transmitted to a drive wheel through the transmission.

In particular, in combination with the properties of a torque augmentation of the torque converter when using a stator shell, a slip rate between the combustion engine and the torque converter can be configured at least in two stages. This means, that in order to start the creeping process, the separation clutch can be controlled to a maximum predetermined creeping torque, and the creeping torque can be controlled downward when a maximum creeping velocity is reached, while maintaining the creeping velocity. The control is surprisingly robust, since the load generated by the torque converter is also reduced as a function of speed. The creeping torque which is regulated downward still suffices to maintain the creeping velocity due to the torque augmentation of the torque converter.

Through the slippage rate of the separation clutch, which is adjustable over a wide range, the creeping velocity can be freely adjusted or preselected over a wide velocity range. The creeping velocity can, e.g., be adjusted as a function of a predetermined driving program, wherein respective driving programs can, e.g., be a sport, comfort, winter, or similar program. Alternatively or additionally, the creeping velocity can be individually adjustable by a driver, e.g., by means of a switch, slide controller or by a selection menu of a vehicle control. It is also advantageous that protective functions influence the creeping velocity, e.g., in order to keep the thermal loading of the separation clutch within limits.

Furthermore, the object is achieved by a drive train for a motor vehicle, comprising a combustion engine, a torque converter and an automated transmission with plural gears, and a separation clutch coupling a combustion engine and a torque converter, wherein with a separation clutch, which is completely closed during a startup process, with short gearing, this means, low gearing, and with a combustion engine operated at idle, a larger velocity is achieved than a maximum creeping velocity. By using a hard converter and/or a long gearing for the startup process, velocities can be achieved, which can only be controlled through the slippage of the separation clutch to an acceptable creeping velocity during idle of the internal combustion engine. Accordingly, the separation clutch is operated with slippage, in order to adjust the creeping velocity.

Thus, the creeping velocity can be set in a manner depending on the properties of the torque converter, so that the slippage of the separation clutch is adjusted through the torque converter as a function of the augmentation of the transferable torque. Thus, e.g., while maintaining a predetermined creeping velocity, the slippage of the separation clutch can be adjusted as a function of a characteristic of the torque transferable through the torque converter as a function of the speed of the pump shell, as a function of the speed of the turbine shell or as a function of the slippage between the two of them. Since the torque transferable through the torque converter increases with speed, the slippage of the separation clutch can, e.g., be increased through the torque converter with increasing transferable torque at constant creeping velocity. Thus, the speed of the combustion engine can be kept substantially constant during the creeping process, e.g., at idle speed.

BRIEF DESCRIPTION OF THE DRAWINGS

The invention is described in more detail with reference to the embodiments illustrated in FIGS. 1 and 2, wherein:

FIG. 2 shows a diagram for describing a control of a creeping method.

DETAILED DESCRIPTION OF THE INVENTION

Figure 1:
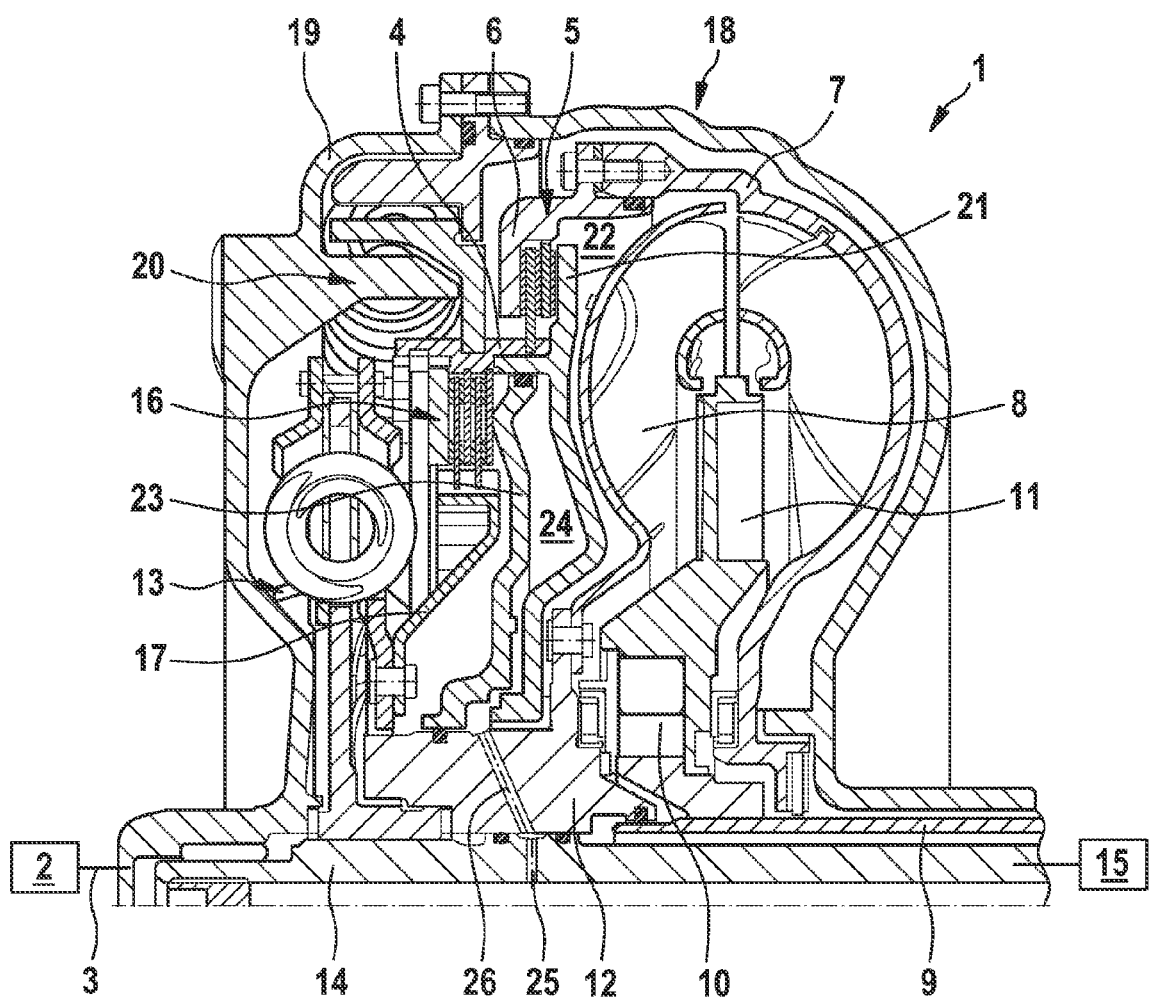
FIG. 1 shows a drive train.

FIG. 1 shows a partially schematically illustrated drive train 1 with an internal combustion engine 2 with a crankshaft 3, which is connected to the input component 4 of a separation clutch 5. The output component 6 of the separation clutch 5 can be connected to the pump shell 7. The pump shell 7 drives a turbine shell 8 and a stator shell 11, disposed at the converter neck 9 and fixed to the housing by means of a freewheeling clutch 10. The turbine shell 8 is connected non-rotatably to the transmission input shaft 14 of the automated transmission 15 by means of the turbine hub 12, which simultaneously forms the input component 17 of the turbine damper 13. When the separation clutch 5 is closed, the converter lockup clutch 16 connects the pump shell 7 with the input component 17 of the turbine damper 13, so that a high slippage between the pump shell 7 and the turbine shell 8 is preferably avoided at higher speeds of the pump shell 7, and so that the torque transmitted from the crankshaft 3 onto the pump shell 7 is directly transmitted through the turbine damper 13 onto the transmission input shaft 14. Between the converter housing 19 and the pump shell 17, furthermore a torsion vibration damper 20 is operatively disposed.

The torque converter 18 is configured as a multifunctional converter, which receives the converter components like the pump shell 7, the turbine shell 8, the stator shell 11, the converter lockup clutch 16, the turbine damper 13 and the torsion vibration damper 20 and the separation clutch 5 in the converter housing 19. In other embodiments, the separation clutch can also be disposed outside of the converter housing 19, e.g., in the form of a dry friction clutch, wherein said friction clutch is actuated, e.g., by a motor operated actuator. The separation clutch is shifted by a piston 21 by axially moving it by a pressure of the operating means established in the converter cavity 22. The converter lockup clutch 16 is shifted by the piston 23 by axially moving the piston through operating means, inducted through the bore hole 25 in the transmission input shaft, and through the bore hole 26 in the turbine hub 12 into the pressure chamber 24, wherein the operating means has higher pressure relative to the operating chamber 22.

By means of a control unit, which is not shown in detail, for controlling the operating means pressures, the separation clutch 5 is closed far enough at the present creeping conditions, e.g., with the gas pedal not actuated, the operating brake and parking brake not actuated, and a vehicle velocity being less than the predetermined creeping velocity, so that a predetermined creeping torque is transmitted.

With this respect, the diagram 27 of FIG. 2 shows a respective creeping process over the time t in three diagram portions disposed on top of one another. Thus, the creeping torque M(K), transmitted through the separation clutch, is plotted in the upper third of the curve 28. The second third shows the speeds n over the time t, wherein the curve 29 illustrates the speed of the internal combustion engine, the curve 30 illustrates the speed of the pump shell, and the curve 31 illustrates the speed of the turbine shell. The lower third shows the curve 32 with the creeping velocity v of the motor vehicle over the time t, which creeping velocity is proportional to the speed of the turbine shell due to the fixed gearing of the startup gear shifted in the transmission.

Before the creeping process begins at the point in time t(1), the separation clutch is already closed to a minimum creeping torque M(min), when a creeping movement of the vehicle is to be expected. Consequently, the speed of the pump shell is not equal to zero. The pump shell rather rotates, e.g., with 250 to 300 l/min, while a start-up, however, is prevented by the brake, which is still actuated. The fuel burn at standstill is reduced through the comparatively small creep torque M(min).

When the brake is opened, the maximum creep torque M(max) is predetermined through the separation clutch at the beginning of the creeping process at the point in time t(1). Consequently, the pump shell is accelerated and the speed of the internal combustion engine decreases slightly for a short period of time, until it is regulated back by the speed regulator to the current idle speed, e.g., 800 to 900 l/min. Thus, a control signal is helpful, which indicates to the internal combustion engine that the separation clutch is being shifted. The turbine shell picks up speed and accelerates the motor vehicle. The pump shell can thus reach the speed of the internal combustion engine and the separation clutch can thus be completely closed.

At the point in time t(2), the speed of the turbine shell or the vehicle velocity come close to the desired creeping velocity. At this point in time, the partial reopening of the separation clutch is started. As a consequence, the pump speed drops and the vehicle acceleration is reduced. The creep torque M(K) is regulated downward until the creeping velocity v(max) at the point in time t(3) is reached, and a respective slippage between the speed of the combustion engine, which is always constant, and pump shell is established.

Until the creeping process is interrupted, e.g., through an actuation of the brake, the motor vehicle is operated with low creeping torque, e.g., with a minimum creeping torque M(min). The creeping velocity is advantageously adjusted to values between 5 and 10 km/hr. Through respective predeterminations by the control software, e.g., through a respective driving program, or through predeterminations by the driver, the target value for the creeping velocity can be predetermined respectively. Accordingly, the minimum and maximum creep torques can be predetermined.

REFERENCE NUMERALS AND DESIGNATIONS 1 drive train
2 internal combustion engine
3 crankshaft
4 input component
5 separation clutch
6 output component
7 pump shell
8 turbine shell
9 converter neck
10 freewheeling clutch
11 stator shell
12 turbine hub
13 turbine damper
14 transmission input shaft
15 transmission
16 converter lockup clutch
17 input component
18 torque converter
19 converter housing
20 torsion vibration damper
21 piston
22 converter cavity
23 piston
24 pressure cavity
25 bore hole
26 bore hole
27 diagram
28 curve
29 curve
30 curve
31 curve
32 curve
M(K) creeping torque
M(min) minimum creeping torque
M(max) maximum creeping torque
n speed
t time
t(1) point in time
t(2) point in time
t(3) point in time
v creeping velocity
v(max) maximum creeping velocity

What we claim is:

1. A method for controlling a creeping process in a drive train (1) with an internal combustion engine (2), a torque converter (18) and a transmission (15), comprising:

decoupling the internal combustion engine (2) and the torque converter (18) from one another through a separation clutch (5); and,
at least partially slipping the separation clutch (5) during the creeping process.

2. The method according to claim 1, further comprising, slipping the separation clutch at a slip rate with at least two stages.

3. The method according to claim 1, further comprising, in order to start the creeping process:
controlling the separation clutch (5) to a predetermined maximum creep torque (M(max)); and
when a creeping velocity is reached, regulating the creeping torque downward while maintaining the creeping velocity (v).

4. The method according to claim 3, further comprising, adjusting the creeping velocity (v) as a function of a predetermined driving program.

5. The method according to claim 4, further comprising, selecting the driving program from the group consisting of sport, comfort and winter program.

6. The method according to claim 3, further comprising, individually adjusting the creeping velocity (v) by a driver.

7. A drive train (1) for a motor vehicle with an internal combustion engine (2), a torque converter (18) and an automated transmission (15) with plural gears and a separation clutch (5), coupling the internal combustion engine (2) and the torque converter (18), wherein a creeping process with predetermined creeping velocity is activated when an accelerator pedal is not actuated and a brake is not actuated, wherein a velocity greater than the creeping velocity is achieved during a start-up process with the shortest gearing and with a completely closed separation clutch (5) and with the combustion engine (2) operated at idle.

8. The drive train (1) according to claim 7, wherein the separation clutch (5) is operated slipping in order to adjust the creeping velocity (v).

9. The drive train (1) according to claim 7, wherein the creeping velocity (v) is adjusted through the torque converter (18) as a function of the slippage of the separation clutch (5) and of the augmentation of the transferable torque.

10. The drive train (1) according to claim 9, wherein the slippage of the separation clutch (5) is increased by the torque converter (18) at constant creeping velocity and with increasing transferrable torque.

11. The drive train (1) according to claim 7, wherein the speed of the internal combustion engine (2) is kept constant during the creeping process.

* * * * *